US012726953B2

(12) United States Patent
Liu et al.

(10) Patent No.: US 12,726,953 B2
(45) Date of Patent: Sep. 1, 2026

(54) SIGNAL SENDING METHOD, SIGNAL RECEIVING METHOD, AND APPARATUS

(71) Applicant: HUAWEI TECHNOLOGIES CO., LTD., Shenzhen (CN)

(72) Inventors: Mengting Liu, Beijing (CN); Xin Gao, Beijing (CN); Jianghua Liu, Beijing (CN); Xingqing Cheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 401 days.

(21) Appl. No.: 18/314,963

(22) Filed: May 10, 2023

(65) Prior Publication Data

US 2023/0284187 A1 Sep. 7, 2023

Related U.S. Application Data

(63) Continuation of application No. PCT/CN2020/128221, filed on Nov. 11, 2020.

(51) Int. Cl.

*H04W 72/044* (2023.01)
*H04W 8/24* (2009.01)
*H04W 72/02* (2009.01)

(52) U.S. Cl.

CPC ........... *H04W 72/044* (2013.01); *H04W 8/24* (2013.01); *H04W 72/02* (2013.01)

(58) Field of Classification Search

CPC ............... H04W 72/044; H04W 72/04; H04W 72/0453; H04W 72/0457; H04W 72/02; H04W 72/11; H04W 72/115; H04W 72/12; H04W 72/40; H04W 8/24; H04W 8/22; H04W 8/245; H04L 5/0051; H04L 5/0007

See application file for complete search history.

(56) References Cited

U.S. PATENT DOCUMENTS 9,112,571 B1 8/2015 Raimondi et al.
2009/0238241 A1 9/2009 Hooli et al.
2014/0211740 A1* 7/2014 Berggren .............. H04L 5/0048 370/329
2019/0115996 A1* 4/2019 Wu ....................... H04L 1/0003

(Continued)

FOREIGN PATENT DOCUMENTS

CN 105589506 A 5/2016
CN 103036820 B * 8/2017

(Continued)

OTHER PUBLICATIONS

Chinese First Office Action issued in corresponding Chinese Application No. 202080106930.9, dated Mar. 27, 2025, pp. 1-10.

(Continued)

*Primary Examiner* — Phong La
(74) *Attorney, Agent, or Firm* — HAUPTMAN HAM, LLP

(57) ABSTRACT

A signal sending method includes generating M signals. The signal sending method also includes sending the M signals on M time-frequency resource elements. The M signals are in a one-to-one correspondence with the M time-frequency resource elements. At least two of the M time-frequency resource elements overlap in a frequency domain. Any two of the M time-frequency resource elements are free from overlapping in a time domain. M is an integer greater than 1.

12 Claims, 8 Drawing Sheets

(56) References Cited

U.S. PATENT DOCUMENTS

| | | | | |
|---|---|---|---|---|
| 2019/0335423 | A1* | 10/2019 | Wu | H04W 72/0453 |
| 2020/0092055 | A1 | 3/2020 | Choi et al. | |
| 2020/0350970 | A1 | 11/2020 | Liu et al. | |
| 2023/0280511 | A1* | 9/2023 | Doshay | G02B 1/002 359/885 |
| 2023/0284187 | A1* | 9/2023 | Liu | H04L 5/0051 |
| 2023/0397203 | A1* | 12/2023 | Zhang | H04L 1/0003 |

FOREIGN PATENT DOCUMENTS

| | | | | | |
|---|---|---|---|---|---|
| CN | 108632005 | A | | 10/2018 | |
| CN | 108762374 | A | * | 11/2018 | H03L 7/07 |
| CN | 109586869 | A | | 4/2019 | |
| CN | 109672463 | A | * | 4/2019 | H04W 72/23 |
| CN | 110392436 | B | * | 7/2020 | H04W 72/30 |
| CN | 111865543 | A | | 10/2020 | |
| WO | WO-2019137328 | A1 | * | 7/2019 | H04W 72/23 |

OTHER PUBLICATIONS

3GPPRAN1#102,Have the pleasure of inviting you to the 3GPP RAN WGs,in Toulouse, France,Aug. 24-28, 2020, total 4 pages.

3GPP TR 22.804 V16.3.0 (Jul. 2020),3rd Generation Partnership Project,Technical Specification Group Services and System Aspects,Study on Communication for Automation in Vertical Domains(Release 16),total 197 pages.

3GPP TS 38.305 V16.2.0 (Sep. 2020),3rd Generation Partnership Project,Technical Specification Group Radio Access Network,NG Radio Access Network (NG-RAN),Stage 2 functional specification of User Equipment (UE) positioning in NG-RAN (Release 16),total 117 pages.

3GPP TS 38.331 V16.2.0 (Sep. 2020),3rd Generation Partnership Project;Technical Specification Group Radio Access Network;NR-;Radio Resource Control (RRC) protocol specification (Release 16),total 916 pages.

3GPP TSG RAN Meeting #86, RP-193237,"New SID on NR Positioning Enhancements",Qualcomm Incorporated, Dec. 9-12, 2019, total 4 pages.

Extended European Search Report issued in corresponding European Application No. 20961081.5, dated Nov. 8, 2023, pp. 1-10.

International Search Report issued in corresponding International Application No. PCT/CN2020/128221, dated Aug. 10, 2021, pp. 1-9.

Extended European Search Report issued in corresponding European Application No. 20961081.5, dated Nov. 8, 2023, pp. 1-9.

3GPP TSG RAN WG1 #102-e R1-2006363:"Considerations for coverage recovery", ITL, Aug. 17-28, 2020, total 3 pages.

Japanese Office Action issued in corresponding Japanese Application No. 2023-528280, dated Feb. 4, 2025, pp. 1-5.

India Office Action issued in corresponding India Application No. 202327034559, dated Jun. 17, 2025, pp. 1-7.

* cited by examiner

SIGNAL SENDING METHOD, SIGNAL RECEIVING METHOD, AND APPARATUS

CROSS-REFERENCE TO RELATED APPLICATIONS

This application is a continuation of International Application No. PCT/CN2020/128221, filed on Nov. 11, 2020, the disclosure of which is hereby incorporated by reference in its entirety.

TECHNICAL FIELD

This application relates to the field of wireless communication technologies, and in particular, to a signal sending method, a signal receiving method, and an apparatus.

BACKGROUND

In a new radio (NR) system, a base station may perform positioning, channel estimation, or the like by measuring an uplink sounding reference signal (SRS) sent by a terminal device. An SRS used for positioning is also referred to as a positioning SRS (pos-SRS). Currently, it is found through research that when an SRS is used for positioning, positioning precision greatly depends on a bandwidth of the SRS. A higher bandwidth indicates higher positioning precision.

To improve positioning precision, one solution is to separately transmit a plurality of positioning signals in a plurality of narrowbands (for example, subcarriers) at different frequencies in a frequency hopping manner. The base station may process the plurality of positioning signals transmitted in the plurality of narrowbands at the different frequencies as a whole, so that the plurality of positioning signals are considered as a signal transmitted in a "large broadband" including a plurality of narrowbands. In this method, one "large broadband" signal can be obtained based on a plurality of "small broadband" signals, to improve positioning precision.

However, when a plurality of positioning signals are transmitted in a frequency hopping manner, each time frequency hopping is performed, a radio frequency transmit channel of the terminal device needs to be retuned to adapt to a frequency used during frequency hopping transmission. Due to retuning of the radio frequency transmit channel, there is a difference between positioning signals transmitted in different narrowbands. This difference affects positioning precision.

SUMMARY

An objective of implementations of this application is to provide a signal sending, method, a signal receiving method, and an apparatus, to resolve a problem of how to reduce a difference between signals transmitted through frequency hopping.

According to a first aspect, an embodiment of this application provides a signal sending method. The method is performed by a terminal device or a module in a terminal device. Herein, an example in which the terminal device executes the method is used for description. The method includes:

- generating M signals; and sending the M signals on M time-frequency resource elements, where the M signals are in a one-to-one correspondence with the M time-frequency resource elements, at least two of the M time-frequency resource elements, partially overlap in frequency domain, any two of the M time-frequency resource elements do not overlap in time domain, and M is an integer greater than 1.

In a possible implementation of the first aspect, the at least two time-frequency resource elements include a first time-frequency resource element and a second time-frequency resource element; and

- a frequency domain resource of the first time-frequency resource element includes a first frequency domain resource and a second frequency domain resource, the first frequency domain resource is an overlapping part of the first time-frequency resource element and the second time-frequency resource element in frequency domain, and the second frequency domain resource is a part other than the first frequency domain resource in the frequency domain resource of the first time-frequency resource element.

In a possible implementation of the first aspect, the at least two time-frequency resource elements further include a third time-frequency resource element; and the second frequency domain resource includes a third frequency domain resource and a fourth frequency domain resource, the third frequency domain resource is an overlapping part of the first time-frequency resource element and the third time-frequency resource element in frequency domain, and the fourth frequency domain resource is a part other than the third frequency domain resource in the second frequency domain resource.

In a possible implementation of the first aspect, the M signals include a first signal and a second signal, the first signal corresponds to the first time-frequency resource element, and the second signal corresponds to the second time-frequency resource element; and

- a bit sequence corresponding to a part that is of the first signal and that is mapped to the first frequency domain resource and a bit sequence corresponding to a part that is of the second signal and that is mapped to the first frequency domain resource has a same value and opposite symbols.

In a possible implementation of the first aspect, the M signals further include the first signal and the second signal, and the third signal corresponds to the third time-frequency resource element; and

- a bit sequence corresponding to a part that is of the first signal and that is mapped to the third frequency domain resource and a bit sequence corresponding to a part that is of the third signal and that is mapped to the third frequency domain resource have a same value and opposite symbols.

In a possible implementation of the first aspect, the M signals are positioning reference signals; and

- a part that is of the M signals and that is mapped to an overlapping frequency domain resource is a phase tracking reference signal, and a part that is of the M signals and that is mapped to a frequency domain resource other than the overlapping frequency domain resource is a positioning reference signal.

In a possible implementation of the first aspect, the method further includes: sending capability information to a network device, where the capability information indicates a frequency division capability of a phase-locked loop.

According to a second aspect, this application provides a signal receiving method. The method is performed by a network device or a module in a network device. Herein, an example in which the network device executes the method is used for description. The method includes:

determining M time-frequency resource elements; and receiving M signals on the M time-frequency resource elements, where the M signals are in a one-to-one correspondence with the M time-frequency resource elements, at least two of the M time-frequency resource elements partially overlap in frequency domain, any two of the M time-frequency resource elements do not overlap in time domain, and M is an integer greater than 1.

In a possible implementation of the second aspect, the M signals include at least two signals, and the at least two signals correspond to the at least two time-frequency resource elements.

The method further includes:

estimating a phase difference between the at least two signals based on a part that is of the at least two signals and that is mapped to an overlapping frequency domain resource; and performing phase compensation on the at least two signals based on the phase difference between the at least two signals.

In a possible implementation of the second aspect, the at least two time-frequency resource elements include a first time-frequency resource element and a second time-frequency resource element; and a frequency domain resource of the first time-frequency resource element includes a first frequency domain resource and a second frequency domain resource, the first frequency domain resource is an overlapping part of the first time-frequency resource element and the second time-frequency resource element in frequency domain, and the second frequency domain resource is a part other than the first frequency domain resource in the frequency domain resource of the first time-frequency resource element.

In a possible implementation of the second aspect, the at least two time-frequency resource elements further include a third time-frequency resource element; and the second frequency domain resource includes a third frequency domain resource and a fourth frequency domain resource, the third frequency domain resource is an overlapping part of the first time-frequency resource element and the third time-frequency resource element in frequency domain, and the fourth frequency domain resource is a part other than the third frequency domain resource in the second frequency domain resource.

In a possible implementation of the second aspect, the M signals include a first signal and a second signal, the first signal corresponds to the first time-frequency resource element, and the second signal corresponds to the second time-frequency resource element; and a bit sequence corresponding to a part that is of the first signal and that is mapped to the first frequency domain resource and a bit sequence corresponding to a part that is of the second signal and that is mapped to the first frequency domain resource has a same value and opposite symbols.

In a possible implementation of the second aspect, the M signals further include the first signal and the second signal, and the third signal corresponds to the third time-frequency resource element; and a bit sequence corresponding to a part that is of the first signal and that is mapped to the third frequency domain resource and a bit sequence corresponding to a part that is of the third signal and that is mapped to the third frequency domain resource have a same value and opposite symbols.

In a possible implementation of the second aspect, the M signals are positioning reference signals; or a part that is of the M signals and that is mapped to an overlapping frequency domain resource is a phase tracking reference signal, and a part that is of the M signals and that is mapped to a frequency domain resource other than the overlapping frequency domain resource is a positioning reference signal.

According to a third aspect, this application further provides a communication apparatus. The communication apparatus has a function of implementing any method provided in the first aspect. The communication apparatus may be implemented by hardware, or may be implemented by hardware executing corresponding software. The hardware or the software includes one or more units or modules corresponding to the foregoing function.

In a possible implementation, the communication apparatus includes a processor. The processor is configured to support the communication apparatus in performing a corresponding function of the terminal device in the foregoing method. The communication apparatus may further include a memory. The memory may be coupled to the processor, and the memory stores program instructions and data for the communication apparatus. Optionally, the communication apparatus further includes a communication interface, and the communication interface is configured to support communication between the communication apparatus and a device such as a network device.

In a possible implementation, the communication apparatus includes corresponding functional modules, configured to implement the steps in the foregoing method. The function may be implemented by hardware, or may be implemented by hardware executing corresponding software. The hardware or the software includes one or more modules corresponding to the foregoing function.

In a possible implementation, a structure of the communication apparatus includes a processing unit and a communication unit. These units may perform corresponding functions in the foregoing method examples. For details, refer to the descriptions in the method provided in the first aspect. The details are not described herein again.

According to a fourth aspect, this application further provides a communication apparatus. The communication apparatus has a function of implementing any method provided in the second aspect. The communication apparatus may be implemented by hardware, or may be implemented by hardware executing corresponding software. The hardware or the software includes one or more units or modules corresponding to the foregoing function.

In a possible implementation, the communication apparatus includes a processor. The processor is configured to support the communication apparatus in performing a corresponding function of the network device in the foregoing method. The communication apparatus may further include a memory. The memory may be coupled to the processor, and the memory stores program instructions and data for the communication apparatus. Optionally, the communication apparatus further includes a communication interface; The communication interface is configured to support communication between the communication apparatus and a device such as a terminal device.

In a possible implementation, the communication apparatus includes corresponding functional modules, configured to implement the steps in the foregoing method. The function may be implemented by hardware, or may be implemented by executing corresponding software by hardware. The hardware or the software includes one or more modules corresponding to the foregoing function.

In a possible implementation, a structure of the communication apparatus includes a processing unit and a communication unit. These units may perform corresponding functions in the foregoing method examples. For details, refer to the descriptions in the method provided in the first aspect. The details are not described herein again.

According to a fifth aspect, a communication apparatus is provided, and includes a processor and a communication interface. The communication interface is configured to: receive a signal from a communication apparatus other than the communication apparatus and transmit the signal to the processor, or send a signal from the processor to a communication apparatus other than the communication apparatus. The processor is configured to implement, by using a logic circuit or executing code instructions, the method provided in the first aspect.

According to a sixth aspect, a communication apparatus is provided, and includes a processor and a communication interface. The communication interface is configured to: receive a signal from a communication apparatus other than the communication apparatus and transmit the signal to the processor, or send a signal from the processor to a communication apparatus other than the communication apparatus. The processor is configured to implement, by using a logic circuit or executing code instructions, the method provided in the second aspect.

According to a seventh aspect, a computer-readable storage medium is provided. The computer-readable storage medium stores a computer program or instructions, and when the computer program or the instructions are executed by a processor, the method provided in the first aspect or the second aspect is implemented.

According to an eighth aspect, a computer program product including instructions is provided. When the instructions are run by a processor, the method provided in the first aspect or the second aspect is implemented.

According to a ninth aspect, a chip system is provided. The chip system includes a processor, and may further include a memory, to implement the method provided in the first aspect or the second aspect. The chip system may include a chip, or may include a chip and another discrete component.

According to a tenth aspect, a communication system is provided. The system includes the apparatus (for example, the terminal device) according to the third aspect and the apparatus (for example, the network device) according to the fourth aspect.

DESCRIPTION OF EMBODIMENTS

The following further describes in detail embodiments of this application with reference to accompanying drawings.

The technical solutions in embodiments of this application may be applied to various communication systems, for example, an NR system and a long term evolution (LTE) system. This is not limited herein.

Figure 1:
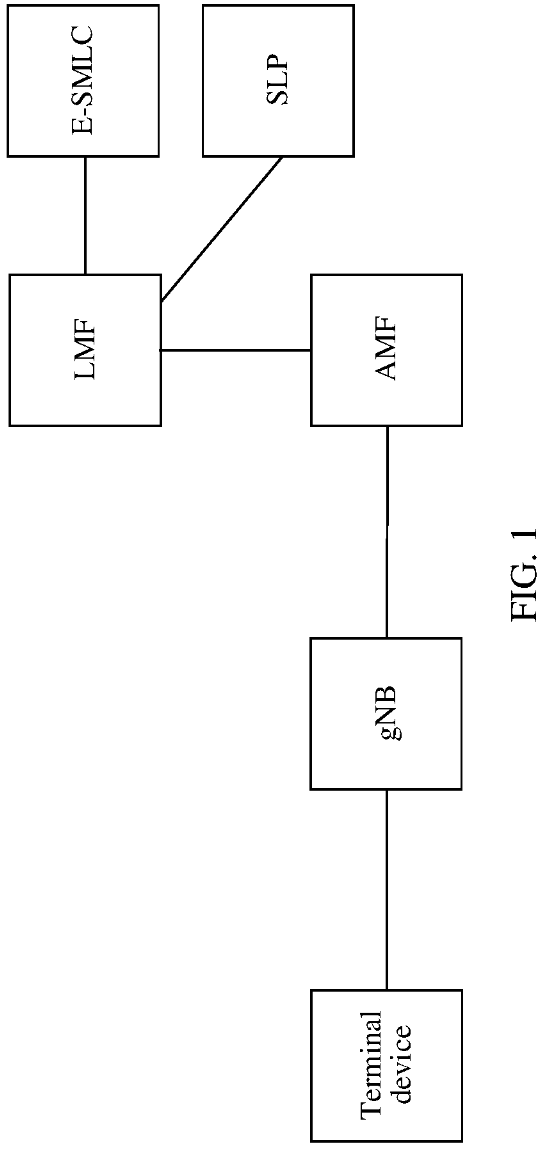
FIG. 1 is a schematic diagram of a 5G core network-based positioning architecture to which an embodiment of this application is applicable.

FIG. 1 is a schematic diagram of a 5G core network-based positioning architecture to which an embodiment of this application is applicable. In the network shown in FIG. 1, functions of functional entities may be as follows:

Terminal device: The terminal device may send a reference signal, for example, a pos-SRS, so that a device such as a next generation NodeB (gNB) on a network side positions the terminal device based on the pos-SRS.

gNB: The gNB may measure a reference signal from a terminal device, to obtain measurement information, and transfer the measurement information to a location management function (LMF) network element. The gNB may further provide another function, for example, provide a wireless connection for the terminal device.

LMF network element: The LMF network element may be responsible for supporting different types of location services related to a target terminal device, including positioning the terminal device and transferring assistance data to the terminal device. A control plane and a user plane of the LMF network element are respectively an enhanced serving mobile location center (E-SMLC) network element and a secure user plane location platform (SLP) network element.

AMF network element: The AMF network element may receive a location service request related to a terminal device, or the AMF network element may perform a location service, and forward the location service request to an LMF. After obtaining location information returned by the terminal device, the AMF network element returns the related location information to a location service (LCS) entity.

In embodiments of this application, the terminal device may be a device that has a wireless transceiver function or a chip that can be disposed in any device, or may be referred to as user equipment (UE), an access terminal, a subscriber unit, a subscriber station, a mobile station, a mobile console, a mobile device, a user terminal, a wireless communication device, or a user apparatus. The terminal device in embodiments of this application may be a mobile phone, a tablet computer (Pad), a computer having a wireless transceiver function, a virtual reality (VR) terminal, an augmented reality (AR) terminal, a wireless terminal in industrial control, a wireless terminal in self driving, a wireless terminal in remote medical, a wireless terminal in a smart grid, or the like.

The terminal device may be a reduced-capability (REDCAP) terminal device, or may be a legacy-capability, normal-capability, or high-capability terminal device, or may be referred to as a legacy terminal device or a normal terminal device. The REDCAP terminal device and the legacy terminal device are different in terms of at least a bandwidth capability. For example, a maximum bandwidth supported by the REDCAP terminal device is low, for example, 50 MHz, 40 MHz, 20 MHz, 15 MHz, 10 MHz, or 5 MHz, and a maximum bandwidth supported by the legacy terminal device is high, for example, 100 MHz.

Network device: The network device may be a gNB in an NR system, an evolved NodeB (eNB) in an LTE system, or the like. When the network device is the gNB, the network device may include a central unit (CU) and a distributed unit (DU).

It should be noted that a network architecture and a service scenario described in embodiments of this application are intended to describe the technical solutions in embodiments of this application more clearly, and do not constitute a limitation on the technical solutions provided in embodiments of this application. A person of ordinary skill in the art may know that with evolution of the network architecture and emergence of new service scenarios, the technical solutions provided in embodiments of this application are also applicable to similar technical problems.

In embodiments of this application, interaction between the terminal device and the network device is used as an example for description. The method provided in embodiments of this application may be further applied to interaction between other entities, for example, interaction between a chip or a module in the terminal device and a chip or a module in the network device. When a chip or a module executes the method, reference may be made to the descriptions in embodiments of this application. Details are not described herein.

Figure 2:
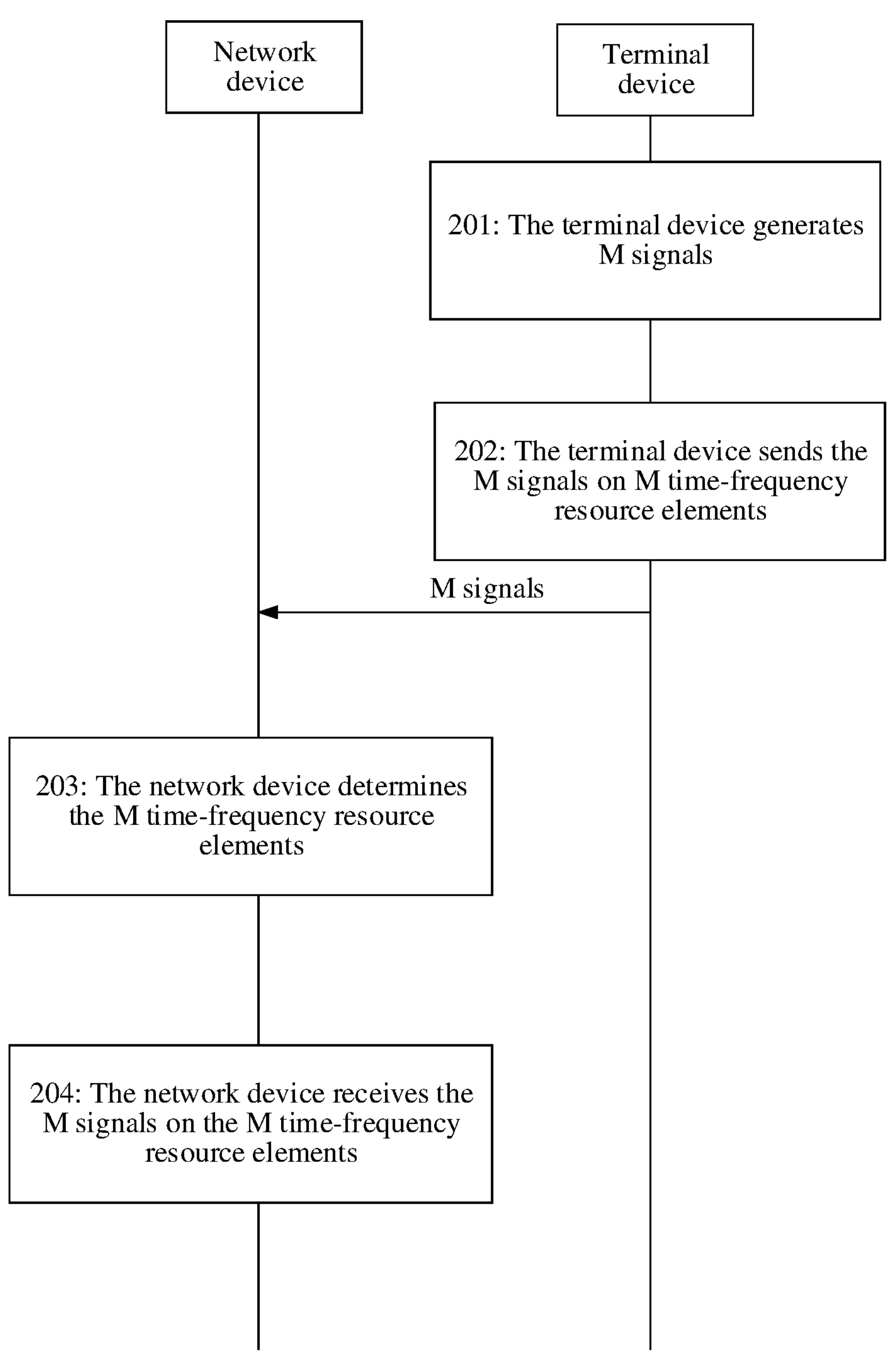
FIG. 2 is a schematic flowchart of a signal transmission method according to an embodiment of this application.

With reference to the foregoing descriptions, FIG. 2 is a schematic flowchart of a signal transmission method according to an embodiment of this application. Refer to FIG. 2. The method includes the following steps.

Step 201: A terminal device generates M signals.

M is an integer greater than 1.

It should be noted that how the terminal device generates the M signals is not limited in this embodiment of this application. Details are not described herein.

Step 202: The terminal device sends the M signals on M time-frequency resource elements.

At least two of the M time-frequency resource elements partially overlap in frequency domain, and any two of the M time-frequency resource elements do not overlap in time domain.

Herein, when more than two time-frequency resource elements partially overlap in frequency domain, every two of the time-frequency resource elements may overlap each other. In some embodiments, for example, there may be no frequency domain resource that belongs to three time-frequency resource elements. For example, a time-frequency resource element #1 and a time-frequency resource element #2 overlap in frequency domain, and the time-frequency resource element #1 and a time-frequency resource element #3 overlap in frequency domain, but the time-frequency resource element #2 and the time-frequency resource element #3 do not overlap in frequency domain. In addition, partial overlapping in frequency domain may be understood as follows: For every two time-frequency resource elements that partially overlap in frequency domain, an overlapping frequency domain resource is only a part of a frequency domain resource of each of the two time-frequency resource elements. For example, the time-frequency resource element #1 and the time-frequency resource element #2 partially overlap, and an overlapping frequency domain resource is only a part of the time-frequency resource element #1 and is only a part of the time-frequency resource element #2.

Step 203: A network device determines the M time-frequency resource elements.

Step 204: The network device receives the M signals on the M time-frequency resource elements.

The network device estimates a phase difference between the at least two signals based on a partially overlapping signal of the at least two signals in frequency domain, and performs phase compensation on the at least two phases based on the phase difference.

In this embodiment of this application, the M signals are in a one-to-one correspondence with the M time-frequency resource elements. In some embodiments, one of the M time-frequency resource elements is used to carry one of the M signals. One of the M signals may correspond to one sending occasion, and M sending occasions corresponding to the M signals may be M consecutive sending occasions.

In this embodiment of this application, the M time-frequency resource elements may have at least one of the following features: 1. The M time-frequency resource elements are M consecutive time-frequency resource elements.

Figure 3:
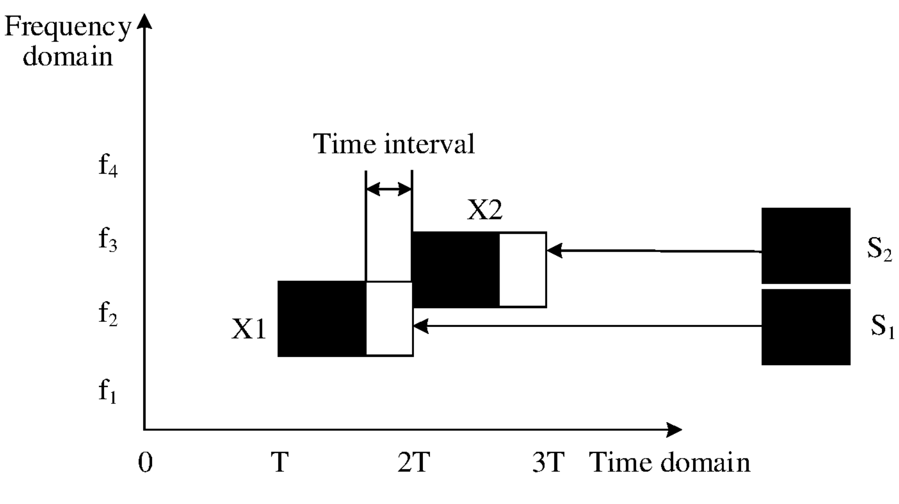
FIG. 3 is a schematic diagram of signal location distribution in frequency domain according to an embodiment of this application.

2. In the M time-frequency resource elements, there is a time interval between adjacent time-frequency resource elements in time domain. For details, refer to FIG. 3. In FIG. 3, signals $S_1$ and $S_2$ are respectively carried on time-frequency resource elements X1 and X2. A time interval is included between the two adjacent time-frequency resource elements X1 and X2. The time interval includes at least one or more orthogonal frequency division multiplexing (OFDM) symbols or slots, and the time interval may be greater than or equal to a time required by a radio frequency transmit channel of a terminal device to perform radio frequency retuning.

3. The M time-frequency resource elements may correspond to M bandwidth units in frequency domain, and one time-frequency resource element corresponds to one bandwidth unit. The bandwidth unit may include at least one subcarrier or include at least one bandwidth part (BWP). Alternatively, the bandwidth unit may be a preset fixed bandwidth. For example, the bandwidth unit is a 20 MHz bandwidth. Correspondingly, one of the M time-frequency resource elements may include at least one OFDM symbol in time domain.

It should be noted that in this embodiment of this application, for any one of the M signals, a bandwidth of the signal may be equal to a bandwidth of a time-frequency resource element carrying the signal, that is, the signal occupies a frequency domain range of the entire time-frequency resource element in frequency domain.

For example, as shown in FIG. 3, it is assumed that duration of a time-frequency resource element in time domain is T OFDM symbols, T is a number greater than 0, and a bandwidth in frequency domain is 20 MHz. A signal carried in the time-frequency resource element may occupy some OFDM symbols in time domain, and occupy 20 MHz in frequency domain, that is, occupy the entire bandwidth of the time-frequency resource element.

Further, in this embodiment of this application, there may be a plurality of implementations of a location relationship between the M time-frequency resource elements or the M signals in frequency domain, and the implementations are separately described below.

Implementation 1: Frequency domain resources occupied by at least two of the M signals in frequency domain partially overlap, and time domain resources occupied by any two of the M signals in time domain do not overlap.

It should be noted that because the signal carried in the time-frequency resource element occupies the entire bandwidth of the time-frequency resource element, this implementation may also be understood as follows: At least two of the M time-frequency resource elements partially overlap in frequency domain, and any two of the M time-frequency resource elements do not overlap in time domain.

It should be noted that when one of the M time-frequency resource elements partially overlaps another time-frequency resource element in frequency domain, the time-frequency resource element may partially overlap a plurality of time-frequency resource elements in frequency domain. Correspondingly, when one of the M signals partially overlaps another signal in frequency domain, the signal may partially overlap a plurality of signals in frequency domain. In the following descriptions, an example in which one time-frequency resource element partially overlaps one or two time-frequency resource elements in frequency domain is used for description, or an example in which one signal partially overlaps one or two signals in frequency domain is used for description. Other cases are not enumerated by using examples.

In a first possible scenario, in the M signals, when frequency domain resources occupied by two signals partially overlap, the two signals are adjacent in time domain. In some embodiments, when frequency domain resources occupied by an $m^{th}$ signal and an $n^{th}$ signal in the M signals partially overlap, a sending occasion corresponding to the $m^{th}$ signal and a sending occasion corresponding to the $n^{th}$ signal are two consecutive sending occasions, where $m-n=1$, $m=1, 2, \ldots,$ and M, and $n=1, 2, \ldots,$ and M.

In this scenario, when two of the M time-frequency resource elements partially overlap in frequency domain, sending occasions corresponding to signals carried in the two time-frequency resource elements are adjacent in time domain. In some embodiments, when an $m^{th}$ time-frequency resource element and an $n^{th}$ time-frequency resource element in the M time-frequency resource elements partially overlap in frequency domain, a sending occasion corresponding to a signal carried in the $m^{th}$ time-frequency resource element and a sending occasion corresponding to a signal carried in the $n^{th}$ time-frequency resource element are two consecutive sending occasions, where $m-n=1$, $m=1, 2, \ldots,$ and M, and $n=1, 2, \ldots,$ and M.

Figure 4:
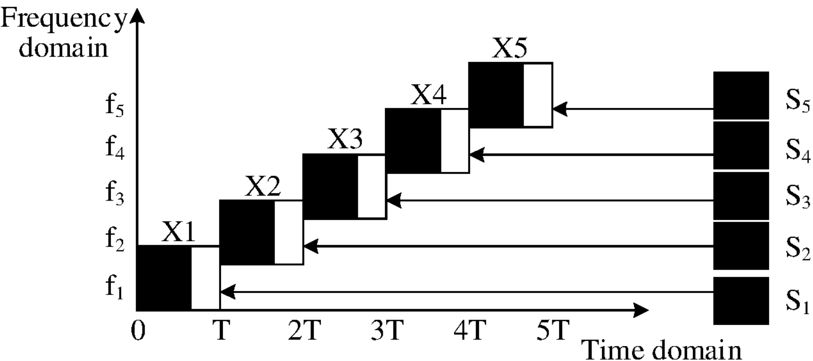
FIG. 4 is a schematic diagram of signal location distribution in frequency domain according to an embodiment of this application.

For example, it is assumed that M=5. An example in which each of the M time-frequency resource elements partially overlaps one or two time-frequency resource elements in frequency domain is used for description. As shown in FIG. 4, signals $S_1$ to $S_5$ are respectively carried on time-frequency resource elements X1 to X5, and adjacent time-frequency resource elements partially overlap in frequency domain. Maximum frequency values (or minimum frequency values) corresponding to the time-frequency resource element X1 to the time-frequency resource element X5 increase sequentially, or center frequencies of the M time-frequency resource elements increase sequentially.

That is, in FIG. 4, in the signals $S_1$ to $S_5$, frequency domain resources occupied by two adjacent signals in frequency domain partially overlap, and maximum values (or minimum values) of frequencies occupied by the two adjacent signals in frequency domain increase sequentially.

Figure 5:
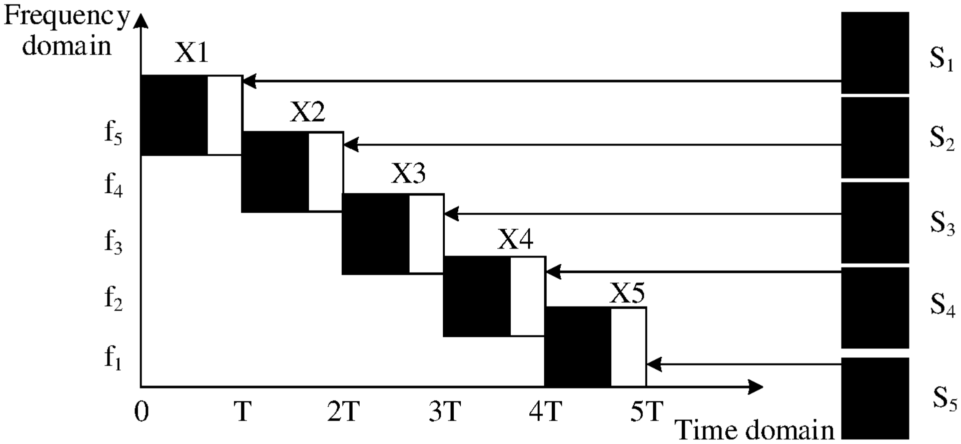
FIG. 5 is a schematic diagram of signal location distribution in frequency domain according to an embodiment of this application.

For another example, it is assumed that M=5. An example in which each of the M time-frequency resource elements partially overlaps one or two time-frequency resource elements in time domain is used for description. As shown in FIG. 5, signals $S_1$ to $S_5$ are respectively carried on time-frequency resource elements X1 to X5, and adjacent time-frequency resource elements partially overlap in frequency domain. Maximum frequency values (or minimum frequency values) corresponding to the time-frequency resource element X1 to the time-frequency resource element X5 decrease sequentially, or center frequencies of the M time-frequency resource elements decrease sequentially.

That is, in FIG. 5, in the signals $S_1$ to $S_5$, frequency domain resources occupied in frequency domain by two signals whose corresponding sending occasions are adjacent partially overlap, and maximum values (or minimum values) of frequencies occupied by the two signals in frequency domain decrease sequentially.

With reference to the foregoing example, it can be learned that if adjacent time-frequency resource elements in time domain partially overlap in frequency domain, center frequencies of the M time-frequency resource elements increase or decrease sequentially. Correspondingly, frequencies occupied by the M signals in frequency domain increase or decrease sequentially.

In a second possible scenario, in the M signals, when frequency domain resources occupied by two signals partially overlap, sending occasions corresponding to the two signals may be adjacent or may not be adjacent in time domain. In some embodiments, when frequency domain resources occupied by an $m^{th}$ signal and an $n^{th}$ signal in the M signals partially overlap, a sending occasion corresponding to the $m^{th}$ signal and a sending occasion corresponding to the $n^{th}$ signal are two consecutive sending occasions, or at least one sending occasion is further included between the sending occasion corresponding to the $m^{th}$ signal and the sending occasion corresponding to the $n^{th}$ signal, where $m-n\geq1$, $m=1, 2, \ldots,$ and M, and $n=1, 2, \ldots,$ and M.

In this scenario, when two of the M time-frequency resource elements partially overlap in frequency domain, sending occasions corresponding to signals carried in the two time-frequency resource elements may be adjacent or may not be adjacent in time domain. In some embodiments, when an $m^{th}$ time-frequency resource element and an $n^{th}$ time-frequency resource element in the M time-frequency resource elements partially overlap in frequency domain, a sending occasion corresponding to a signal carried in the $m^{th}$ time-frequency resource element and a sending occasion corresponding to a signal carried in the $n^{th}$ time-frequency resource element are two consecutive sending occasions, or at least one sending occasion is further included between the sending occasion corresponding to the signal carried in the $m^{th}$ time-frequency resource element and the sending occasion corresponding to the signal carried in the $n^{th}$ time-frequency resource element, where m−n≥1, m=1, 2, . . . , and M, and n=1, 2, . . . , and M.

Figure 6:
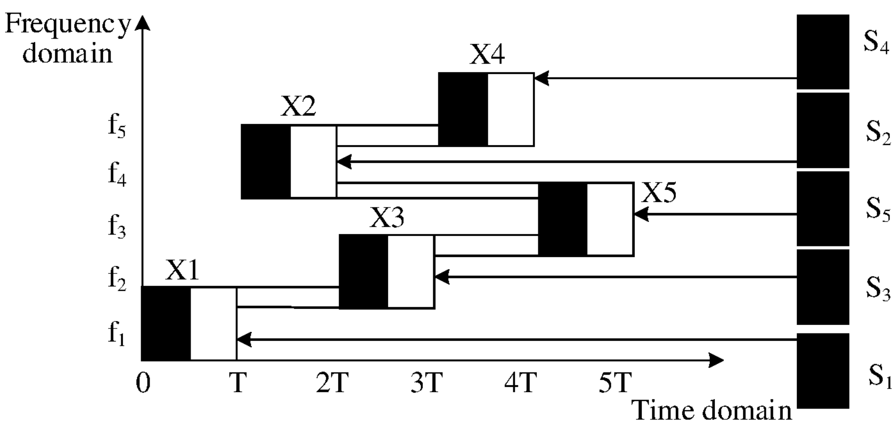
FIG. 6 is a schematic diagram of signal location distribution in frequency domain according to an embodiment of this application.

For example, it is assumed that M=5. As shown in FIG. 6, signals $S_1$ to $S_5$ are respectively sent on five consecutive sending occasions in time domain, and five time-frequency resource elements corresponding to the five sending occasions are a time-frequency resource element X1 to a time-frequency resource element X5. The time-frequency resource element X1 partially overlaps the time-frequency resource element X3 in frequency domain; the time-frequency resource element X2 partially overlaps the time-frequency resource element X4 and the time-frequency resource element X5 in frequency domain; the time-frequency resource element X3 partially overlaps the time-frequency resource element X1 and the time-frequency resource element X5 in frequency domain; the time-frequency resource element X4 partially overlaps the time-frequency resource element X2 in frequency domain; and the time-frequency resource element X5 partially overlaps the time-frequency resource element X2 and the time-frequency resource element X3 in frequency domain.

That is, the signal $S_1$ partially overlaps the signal $S_3$ in frequency domain; the signal $S_2$ partially overlaps the signal $S_4$ and the signal $S_5$ in frequency domain; the signal $S_3$ partially overlaps the signal $S_1$ and the signal $S_5$ in frequency domain; the signal $S_4$ partially overlaps the signal $S_2$ in frequency domain; and the signal $S_5$ partially overlaps the signal $S_2$ and the signal $S_3$ in frequency domain.

Figure 7:
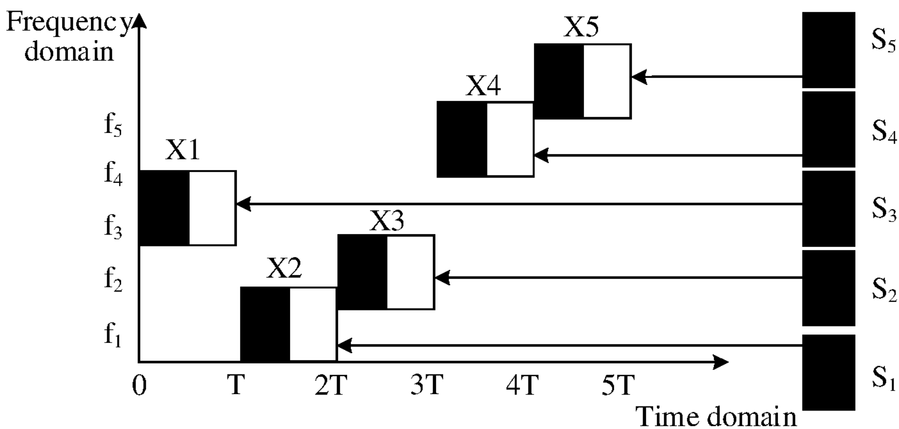
FIG. 7 is a schematic diagram of signal location distribution in frequency domain according to an embodiment of this application.

For another example, it is assumed that M=5. As shown in FIG. 7, signals $S_1$ to $S_5$ are respectively sent on five consecutive sending occasions in time domain, and five time-frequency resource elements corresponding to the five sending occasions are a time-frequency resource element X1 to a time-frequency resource element X5. The time-frequency resource element X1 partially overlaps the time-frequency resource element X3 and the time-frequency resource element X4 in frequency domain; the time-frequency resource element X2 partially overlaps the time-frequency resource element X3 in frequency domain; the time-frequency resource element X3 partially overlaps the time-frequency resource element X1 and the time-frequency resource element X2 in frequency domain; the time-frequency resource element X4 partially overlaps the time-frequency resource element X1 and the time-frequency resource element X5 in frequency domain; and the time-frequency resource element X5 partially overlaps the time-frequency resource element X4 in frequency domain.

That is, the signal $S_1$ partially overlaps the signal $S_3$ and the signal $S_4$ in frequency domain; the signal $S_2$ partially overlaps the signal $S_3$ in frequency domain; the signal $S_3$ partially overlaps the signal $S_1$ and the signal $S_2$ in frequency domain; the signal $S_4$ partially overlaps the signal $S_1$ and the signal $S_5$ in frequency domain; and the signal $S_5$ partially overlaps the signal $S_4$ in frequency domain.

Implementation 2: Frequency domain resources occupied by any two of the M signals in frequency domain do not overlap, and time domain resources occupied by any two of the M signals in time domain do not overlap.

It should be noted that this implementation may also be understood as follows: Any two of the M time-frequency resource elements do not overlap in frequency domain, and any two of the M time-frequency resource elements do not overlap in time domain.

Figure 8:
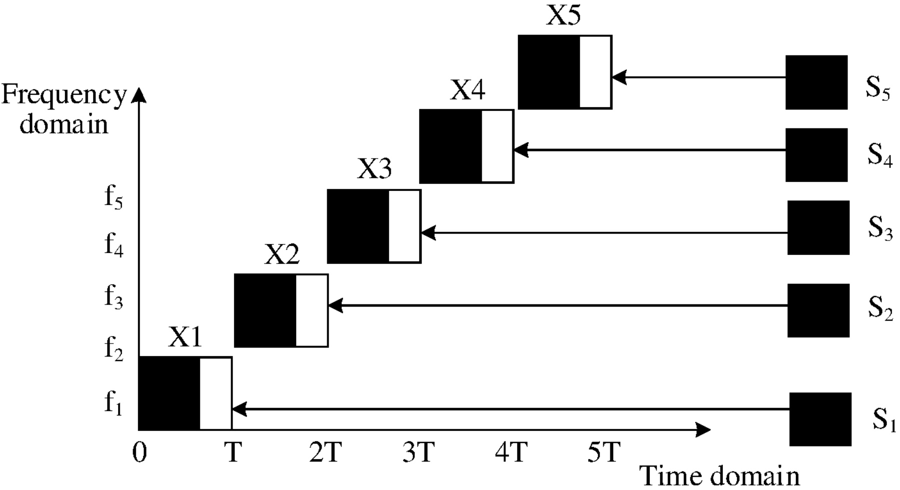
FIG. 8 is a schematic diagram of signal location distribution in frequency domain according to an embodiment of this application.
Figure 9:
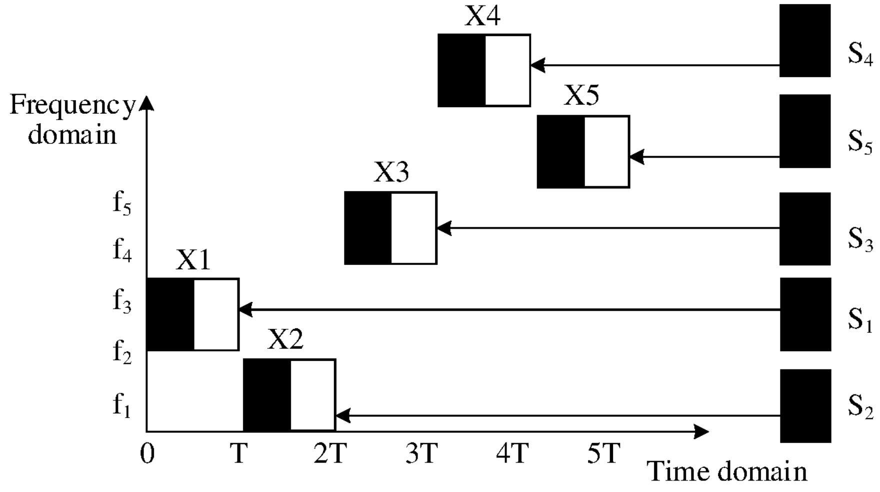
FIG. 9 is a schematic diagram of signal location distribution in frequency domain according to an embodiment of this application.

For example, it is assumed that M=5. As shown in FIG. 8, signals $S_1$ to $S_5$ are respectively sent on five consecutive sending occasions in time domain, and five time-frequency resource elements corresponding to the five sending occasions are a time-frequency resource element X1 to a time-frequency resource element X5. Any two of the time-frequency resource elements X1 to X5 do not overlap in frequency domain, that is, frequency domain resources occupied by any two of the signals $S_1$ to $S_5$ do not overlap. In FIG. 8, an example in which a center frequency of the time-frequency resource element X1 to a center frequency of the time-frequency resource element X5 increase sequentially (or in ascending order in frequency domain) is used for description. The M time-frequency resource elements may be distributed in frequency domain in another form. For example, FIG. 9 is a schematic diagram of a location of another time-frequency resource element according to this application. In FIG. 9, a time-frequency resource element X1 to a time-frequency resource element X5 are not distributed in descending order or ascending order in frequency domain, but are distributed out of order without a specific rule.

With reference to the foregoing descriptions, for any one of the M signals, for example, a first signal, a frequency domain resource occupied by the first signal may include two parts: a first frequency domain resource and a second frequency domain resource. Optionally, the second frequency domain resource may further include two parts: a third frequency domain resource and a fourth frequency domain resource.

It should be noted that, the third frequency domain resource may be located between the first frequency domain resource and the fourth frequency domain resource. A sum of a bandwidth corresponding to the first frequency domain resource and a bandwidth corresponding to the second frequency domain resource is less than or equal to a bandwidth of the first signal. Values of the bandwidth corresponding to the first frequency domain resource and the bandwidth corresponding to the second frequency domain resource are not limited in this embodiment of this application. In addition, a sum of a bandwidth corresponding to the third frequency domain resource and a bandwidth corresponding to the fourth frequency domain resource is less than or equal to the bandwidth corresponding to the second frequency domain resource. Values of the bandwidth corresponding to the third frequency domain resource and the bandwidth corresponding to the fourth frequency domain resource are not limited in this embodiment of this application.

Optionally, when the first signal partially overlaps a second signal in the M signals in frequency domain, the first frequency domain resource is an overlapping part of the frequency domain resource occupied by the first signal and a frequency domain resource occupied by the second signal, and the second frequency domain resource is a part other than the first frequency domain resource in the frequency domain resource occupied by the first signal.

When the first signal further partially overlaps a third signal in the M signals in frequency domain, the fourth frequency domain resource is an overlapping part of the frequency domain resource occupied by the first signal and a frequency domain resource occupied by the third signal in frequency domain, and the third frequency domain resource is a part other than the fourth frequency domain resource in the second frequency domain resource.

Figure 10:
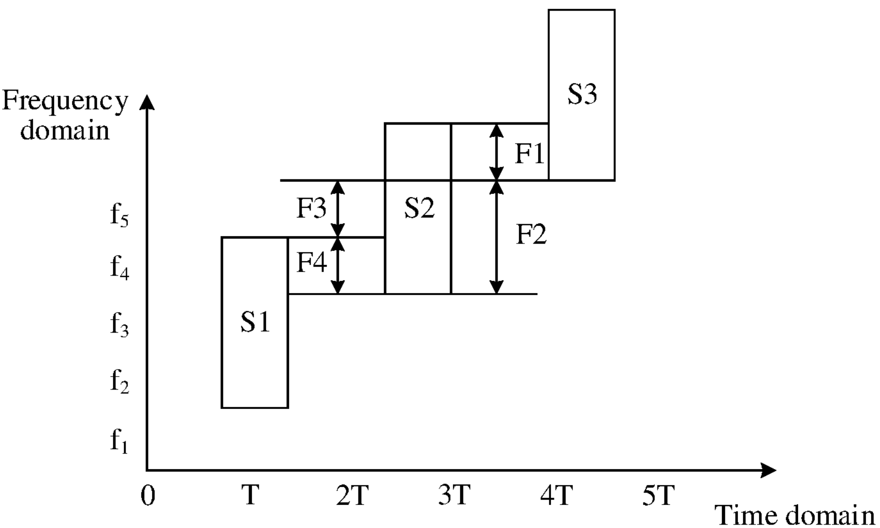
FIG. 10 is a schematic diagram of signal location distribution in frequency domain according to an embodiment of this application.

For example, as shown in FIG. 10, it is assumed that M=3, that is, three signals S1, S2, and S3 are included. The signal S2 is used as an example for description. A frequency domain resource occupied by the signal S2 may include a first frequency domain resource F1 and a second frequency domain resource F2. The second frequency domain resource F2 may further include a third frequency domain resource F3 and a fourth frequency domain resource F4.

If the signal S2 partially overlaps another signal in frequency domain, for example, as shown in FIG. 10, the signal S2 partially overlaps with the signals S1 and S3 in frequency domain, the first frequency domain resource F1 occupied by the signal S2 may be a part that is in the frequency domain resource occupied by the signal S2 and that overlaps a frequency domain resource occupied by the signal S3; the fourth frequency domain resource F4 occupied by the signal S2 may be a part that is in the frequency domain resource occupied by the signal S2 and that overlaps a frequency domain resource occupied by the signal S1; and the third frequency domain resource F3 occupied by the signal S2 may be a part other than the first frequency domain resource F1 and the third frequency domain resource F3 in the frequency domain resource occupied by the signal S2.

Figure 11:
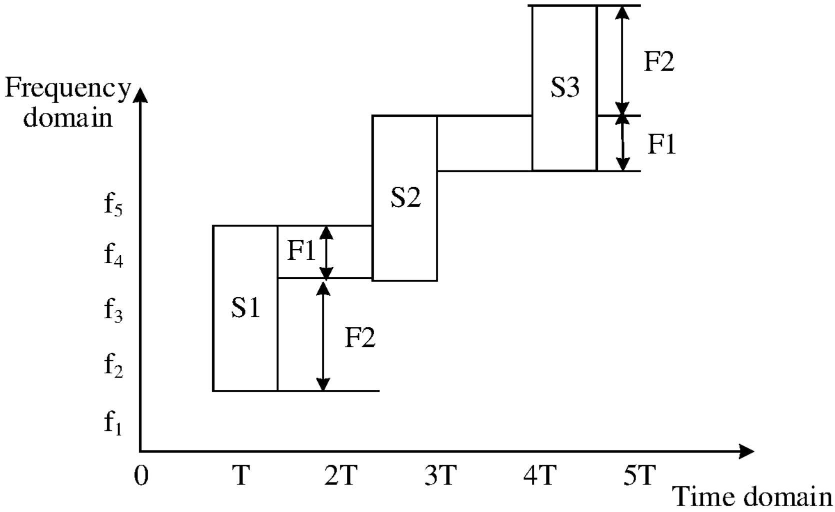
FIG. 11 is a schematic diagram of signal location distribution in frequency domain according to an embodiment of this application.

For another example, as shown in FIG. 11, signals S1 and S3 are used as an example for description. A frequency domain resource occupied by the signal S1 may include a first frequency domain resource F1 and a second frequency domain resource F2. A frequency domain resource occupied by the signal S3 may include a first frequency domain resource F1 and a second frequency domain resource F2.

The first frequency domain resource F1 occupied by the signal $S_1$ may be a part that is in the frequency domain resource occupied by the signal S1 and that overlaps a frequency domain resource occupied by the signal S2; and a second frequency domain resource F2 occupied by the signal S2 may be a part other than a first frequency domain resource F1 in the frequency domain resource occupied by the signal S2. Correspondingly, the first frequency domain resource F1 occupied by the signal S3 may be a part that is in the frequency domain resource occupied by the signal S3 and that overlaps the frequency domain resource occupied by the signal S2; and the second frequency domain resource F2 occupied by the signal S3 may be a part other than the first frequency domain resource F1 in the frequency domain resource occupied by the signal S3.

It should be noted that one signal occupies an entire bandwidth or a part of a bandwidth of a time-frequency resource element carrying the signal. Therefore, the foregoing descriptions are also applicable to the M time-frequency resource elements. In some embodiments, for any one of the M time-frequency resource elements, a frequency domain resource occupied by the time-frequency resource element may include two parts: a first frequency domain resource and a second frequency domain resource. Optionally, the second frequency domain resource may further include two parts: a third frequency domain resource and a fourth frequency domain resource. For ease of description, descriptions are provided below from a perspective of a signal. A "signal" may be replaced with a "time-frequency resource element", to obtain a similar technical solution. Details are not described herein again.

With reference to the foregoing descriptions, if the first signal and the second signal partially overlap in frequency domain, in an implementation, a bit sequence corresponding to a part that is of the first signal and that is mapped to the first frequency domain resource and a bit sequence corresponding to a part that is of the second signal and that is mapped to the first frequency domain resource have a same value. In another implementation, a bit sequence corresponding to a part that is of the first signal and that is mapped to the first frequency domain resource and a bit sequence corresponding to a part that is of the second signal and that is mapped to the first frequency domain resource have a same value and opposite symbols, where the "sign" herein is a positive sign or a negative sign.

In this method, a phase difference between a phase of the signal that is of the first signal, that is mapped to the first frequency domain resource, and that corresponds to the bit sequence and a phase of the signal that is of the second signal, that is mapped to the first frequency domain resource, and that corresponds to the bit sequence may be 180°+N×360°, where N is an integer.

Optionally, if the first signal further partially overlaps the third signal in frequency domain, in an implementation, a bit sequence corresponding to a part that is of the first signal and that is mapped to the fourth frequency domain resource and a bit sequence corresponding to a part that is of the third signal and that is mapped to the fourth frequency domain resource have a same value. In another implementation, a bit sequence corresponding to a part that is of the first signal and that is mapped to the fourth frequency domain resource and a bit sequence corresponding to a part that is of the third signal and that is mapped to the fourth frequency domain resource have a same value and opposite symbols.

In this method, a phase difference between a phase of the signal that is of the first signal, that is mapped to the fourth frequency domain resource, and that corresponds to the bit sequence and a phase of the signal that is of the third signal, that is mapped to the fourth frequency domain resource, and that corresponds to the bit sequence may be 180°+N×360°, where N is an integer.

Optionally, in a possible implementation, each of the M signals may be a positioning reference signal, and the positioning reference signal includes but is not limited to a pos-SRS.

Optionally, in another possible implementation, a part that is of the M signals and that is mapped to an overlapping frequency domain resource is a phase tracking reference signal or any signal, and a part that is of the M signals and that is mapped to a frequency domain resource other than the overlapping frequency domain resource is a positioning reference signal. In some embodiments, for example, the first signal and the second signal partially overlap in frequency domain, and the overlapping frequency domain resource is a first frequency domain resource. A signal that is of the first signal and that is mapped to the first frequency domain resource is a phase tracking reference signal or any signal, and a signal that is of the first signal and that is mapped to the second frequency domain resource is a positioning reference signal. Correspondingly, a signal that is of the second signal and that is mapped to the first frequency domain resource is a phase tracking reference signal, and a signal that is of the second signal and that is mapped to the second frequency domain resource is a positioning reference signal.

If the first signal further overlaps the third signal in frequency domain, and the overlapping frequency domain resource is a fourth frequency domain resource, a signal that is of the first signal and that is mapped to the fourth frequency domain resource is a phase tracking reference signal or any signal, and a signal that is of the first signal and that is mapped to the third frequency domain resource is a positioning reference signal. Correspondingly, a signal that is of the third signal and that is mapped to the fourth frequency domain resource is a phase tracking reference signal, and a signal that is of the third signal and that is mapped to the third frequency domain resource is a positioning reference signal.

Optionally, when each of the M signals includes a positioning reference signal, positioning reference signals included in two signals whose corresponding sending occasions are adjacent are orthogonal to each other.

It should be noted that, if the terminal device sends the M signals on different frequency domain resources, because phases of the signals on the different frequency domain resources jump in time domain, and the phase jump is caused when a phase-locked loop of the terminal device re-locks a phase of the signal, there is a phase difference between the signals sent on different frequency domain resources. It is assumed that when each of the M signals includes a positioning reference signal, the M signals may be used for positioning. A principle of positioning is mainly to correlate a local signal with a high-bandwidth signal obtained after the M signals restored from a receiving side are combined, and estimate a signal arrival delay by searching for a peak value. If there is a phase difference between signals sent on different frequency domain resources, the high-bandwidth signal restored from the receiving side includes a lot of interference, and a result obtained through correlation with the local signal may have a plurality of correlation peaks, thereby affecting positioning precision. In embodiments of this application, the network device may estimate a phase difference between two signals based on an overlapping part of the two signals in frequency domain, to compensate for a phase. Details are described below.

With reference to the foregoing descriptions, descriptions are provided by using an example in which the terminal device sends a 20 MHz signal sequence each time and continuously sends M signals in the M time-frequency resource elements, and an example in which the network device superimposes the M signals received in the M time-frequency resource elements to restore a high-bandwidth signal.

Figure 12:
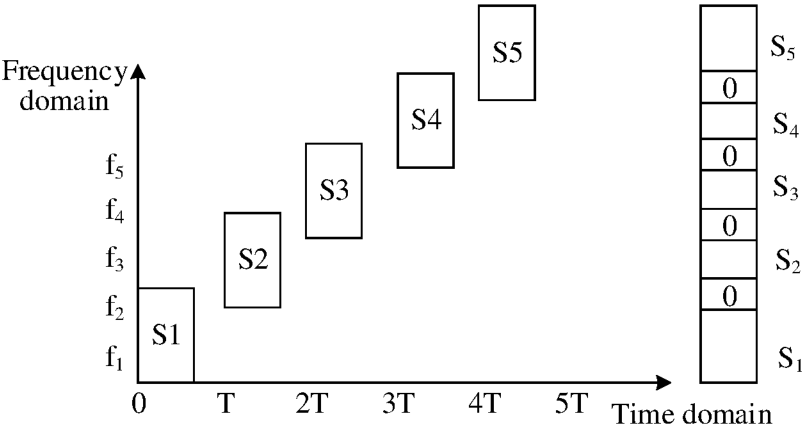
FIG. 12 is a schematic diagram of signal location distribution in frequency domain according to an embodiment of this application.

It is assumed that when frequency domain resources occupied by two of the M signals sent by the terminal device in the M time-frequency resource elements partially overlap, sending occasions corresponding to the two signals are adjacent. For example, as shown in FIG. 12, M=5, center frequencies of frequency domain resources occupied by signals S1 to S5 increase sequentially, and the signals S1 to S5 each are sent on a time-frequency resource element of a corresponding frequency $f_i$, where i=1, 2, . . . , 5. Phases of the signals S1 to S5 may be respectively $\varphi_1$ to $\varphi_5$. It is assumed that a bandwidth occupied by each signal is 20 MHz. When frequency domain resources occupied by two signals partially overlap, a bandwidth of the overlapping part may be 2 MHz.

For two signals that partially overlap in frequency domain, the network device may estimate a phase difference between the two signals based on a channel estimation result of the overlapping part in frequency domain, and then perform phase compensation in time domain, to align the two signals to a same phase. The signal S1 and the signal S2 are used as an example below for description.

First, the network device performs channel estimation based on an overlapping signal of the signal S1 and the signal S2 in frequency domain. Assuming that a channel gain corresponding to the signal S2 is h(t_1), an amplitude is a(t_1), and a phase is $\varphi_1$, the following relationship may be satisfied:

$$h(t\_1)=a(t\_1)e^{-j\varphi_1}.$$

Assuming that a channel gain corresponding to the signal S2 is h(t_2), an amplitude is a(t_2), and a phase is $\varphi_2$, the following relationship may be satisfied:

$$h(t\_\_2)=a(t\_2)e^{-j\varphi_2}.$$

If a difference between a(t_2) and a(t_1) is small, assuming that the difference is equal to 0, a phase difference $\Delta\varphi_1$ estimated based on a ratio of h(t_2) to h(t_1) may satisfy the following relationship:

$$h(t\_2)/h(t\_1)=e^{-j(\varphi_2-\varphi_1)};\text{ and}$$

$$\Delta\varphi_1=\varphi_2-\varphi_1.$$

After determining the phase difference between the signal S1 and the signal S2, the network device may set phases of the signal S1 and the signal S2 to a same phase. For example, the network device compensates for the phase of the signal S2 based on the phase difference, and compensates for the phase of the signal S2 to obtain $\varphi_1$.

According to a same method, the network device may set phases of the M signals to a same phase, for example, to a phase of a first sent signal in the M signals. Based on the foregoing process, the network device compensates for the phases of the M signals, to eliminate impact of random phase jump between signals transmitted in different time-frequency resource elements, thereby implementing high-precision positioning.

Optionally, in a possible implementation, the terminal device may further send capability information to the network device, where the capability information indicates a frequency division capability of a phase-locked loop of the terminal device. For example, the frequency division capability may be a step of frequency divider by 4 or 8. The network device may adjust the estimated phase difference based on the frequency division capability of the phase-locked loop of the terminal device.

For example, when the frequency division capability is frequency divider by 4, a value of a phase difference between signals in different time-frequency resource elements is any value in $\{0, \pi/2, \pi, 3\pi/2\}$. When the frequency division capability is frequency divider by 8, a value of a phase difference between signals in different time-frequency resource elements is any value in $\{0, \pi/4, \pi/2, 3\pi/4, \pi, 5\pi/4, 3\pi/2, 7\pi/4\}$.

For example, the frequency division capability is frequency divider by 4. Because a random phase error generated by re-locking of the phase-locked loop is any one of the four values $\{0, \pi/2, \pi, 3\pi/2\}$ if the phase difference between the two signals that is estimated by the network device is 86°, the network device may correct the phase difference to $\pi/2$ based on the frequency division capability.

Optionally, in a possible implementation, when the first signal in the M signals and the second signal in the M signals partially overlap in frequency domain, when a bit sequence corresponding to a part that is of the first signal and that is mapped to the first frequency domain resource and a bit sequence corresponding to a part that is of the second signal and that is mapped to the first frequency domain resource have a same value and opposite symbols, the network device superimposes the part that is of the first signal and that is mapped to the first frequency domain resource and the part that is of the second signal and that is mapped to the first frequency domain resource to obtain a bit sequence 0, so that interference caused by the bit sequence in the first frequency domain resource can be eliminated, and phase difference estimation can be improved.

If the first signal further partially overlaps the third signal in frequency domain, when a bit sequence corresponding to a part that is of the first signal and that is mapped to the fourth frequency domain resource and a bit sequence corresponding to a part that is of the third signal and that is mapped to the fourth frequency domain resource have a same value and opposite symbols, the network device superimposes the part that is of the first signal and that is mapped to the fourth frequency domain resource and the part that is of the third signal and that is mapped to the fourth frequency domain resource to obtain a bit sequence 0, so that interference caused by the bit sequence in the fourth frequency domain resource can be eliminated, and phase difference estimation accuracy can be improved.

For example, as shown in FIG. 12, signals S1 to S5 are respectively sent on different time-frequency resource elements. Bit sequences corresponding to an overlapping part that is of two signals and that is mapped in frequency domain have a same value and opposite symbols. When the network device finally combines the signals S1 to S5 into a high-bandwidth signal, a value obtained after the bit sequences corresponding to the overlapping part in frequency domain are superimposed is 0.

Figure 13:
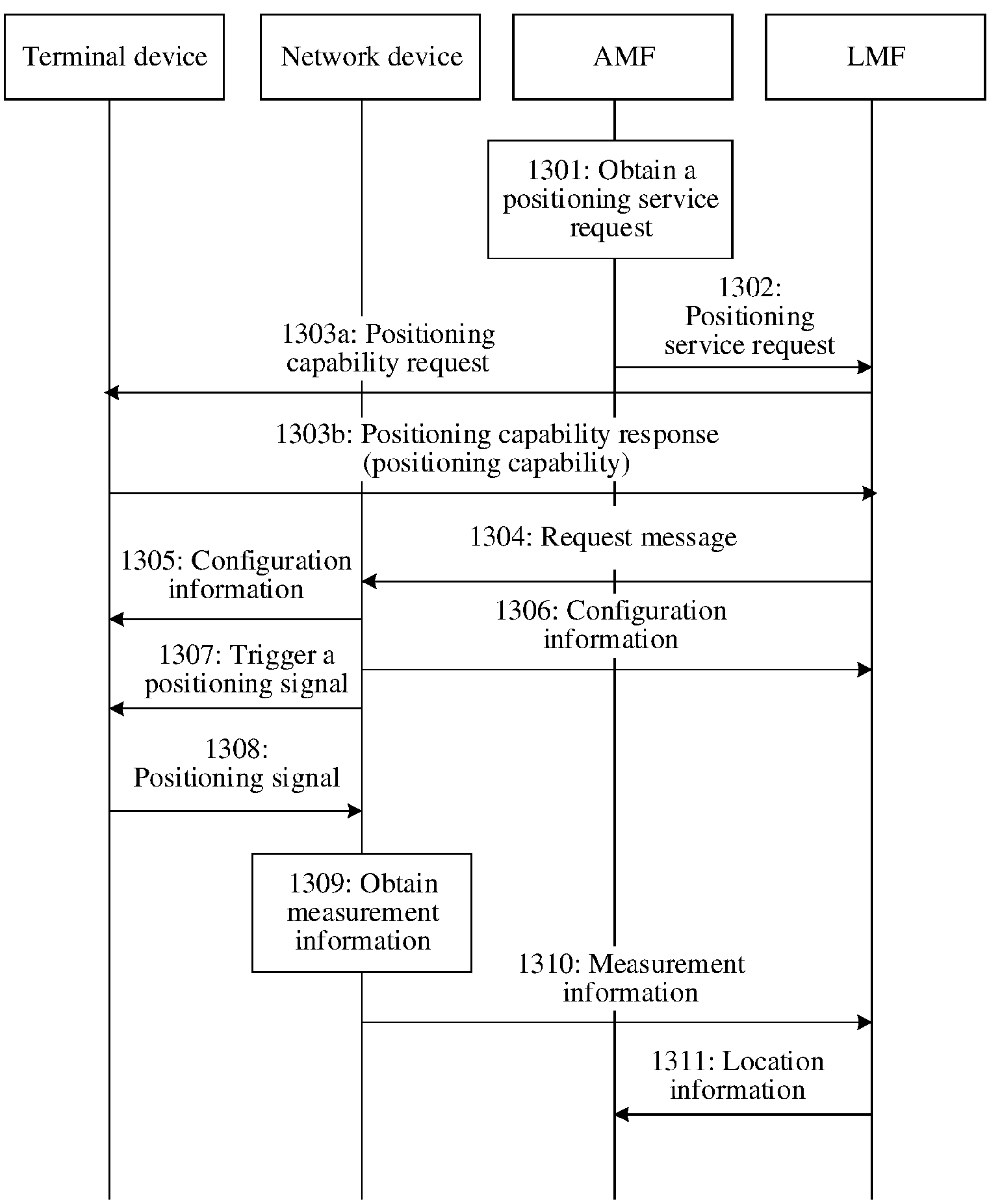
FIG. 13 is a schematic diagram of a positioning procedure according to an embodiment of this application.

FIG. 13 is a schematic diagram of a positioning procedure to which an embodiment of this application is applicable. FIG. 13 lists only some steps in the positioning procedure. Detailed steps in the positioning procedure vary with different positioning scenarios and methods, and are not listed one by one herein.

Step 1301: An AMF network element obtains a positioning service request, where the positioning service request is used to obtain information such as a positioning location of a terminal device.

The positioning service request may be sent by an LCS entity, or may be sent by the terminal device. This is not limited in this embodiment of this application.

Step 1302: The AMF network element forwards the positioning service request to an LMF network element.

Step 1303*a*: The LMF network element sends a positioning capability request message to the terminal device, where the positioning message is used to request a positioning capability of the terminal device.

For example, the positioning message may be sent by using an LTE positioning protocol (LPP) message.

Step 1303*b*: The terminal device sends a positioning capability response message to the LMF network element, where the positioning capability response message includes the positioning capability of the terminal device.

The positioning capability refers to a positioning technology supported by the terminal device, for example, a capability of supporting global navigation satellite system (GNSS)-based positioning, a capability of supporting an observed time difference of arrival (OTDOA)-based positioning technology, and a capability of supporting sensor-based positioning.

Step 1304: The LMF network element sends a request message to a network device, to request related information of a positioning signal, for example, configuration information of the positioning signal.

The positioning signal may be a signal sent by the terminal device by using the M time-frequency resource elements in the foregoing embodiment.

Step 1305: The network device sends the configuration information of the positioning signal to the terminal device.

The configuration information may indicate one or more of the following:

- locations, a quantity N, and the like of time-frequency resource elements occupied by the positioning signal;
- a quantity of frequency hopping times in the N time-frequency resource elements, for example, the quantity of frequency hopping times may be equal to N;
- a comb size;
- a quantity that is of (code domain) orthogonalization dimensions and that can be achieved through cyclic shift; and
- a reference sequence, or a parameter for generating a reference sequence.

The configuration information may further include other content. Details are not described herein.

Step 1306: The network device sends the configuration information of the positioning signal to the LMF network element.

Optionally, step 1307 is performed, that is, the network device triggers the terminal device to send the positioning signal.

Step 1308: The terminal device sends the positioning signal.

The positioning signal may be the M signals described above. For details, refer to the descriptions in step 201 and step 202.

Step 1309: The network device receives the positioning signal, and measures the positioning signal to obtain measurement information.

The measurement information may include but is not limited to a reference signal time difference (RSTD), a round trip time (RTT), reference signal received power (RSRP), reference signal received quality (RSRQ), and the like.

Step 1310: The network device sends the measurement information to the LMF network element.

Step 1311: The LMF network element performs location calculation based on the measurement information, to obtain location information, and sends the location information to the AMF network element.

How the LMF network element determines the location information based on the measurement information is not limited in this embodiment of this application.

The LMF network element may further send the location information to the terminal device, the network device, or the like.

The foregoing descriptions are merely an example. The positioning procedure may further include another step. Details are not described herein.

In the foregoing embodiments provided in this application, the methods provided in embodiments of this application are separately described from a perspective of interaction between devices. To implement functions in the method provided in the foregoing embodiments of this application, the network device or the terminal device may include a hardware structure and/or a software module, and implements the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

In embodiments of this application, division into the modules is an example and is merely logical function division, and may be other division in an actual implementation. In addition, functional modules in embodiments of this application may be integrated into one processor, or may exist alone physically, or two or more modules may be integrated into one module. The integrated module may be implemented in a form of hardware, or may be implemented in a form of a software functional module.

Figure 14:
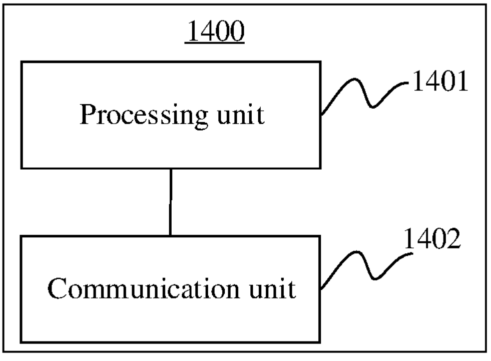
FIG. 14 is a schematic diagram of a structure of a communication apparatus according to an embodiment of this application.

Same as the foregoing concept, as shown in FIG. 14, an embodiment of this application further provides an apparatus 1400, configured to implement functions of the network device or the terminal device in the foregoing methods. For example, the apparatus may be a software module or a chip system. In this embodiment of this application, the chip system may include a chip, or may include a chip and another discrete component. The apparatus 1400 may include a processing unit 1401 and a communication unit 1402.

In this embodiment of this application, the communication unit may also be referred to as a transceiver unit, and may include a sending unit and/or a receiving unit, which are respectively configured to perform sending and receiving steps of the network device or the terminal device in the foregoing method embodiments.

Figure 15:
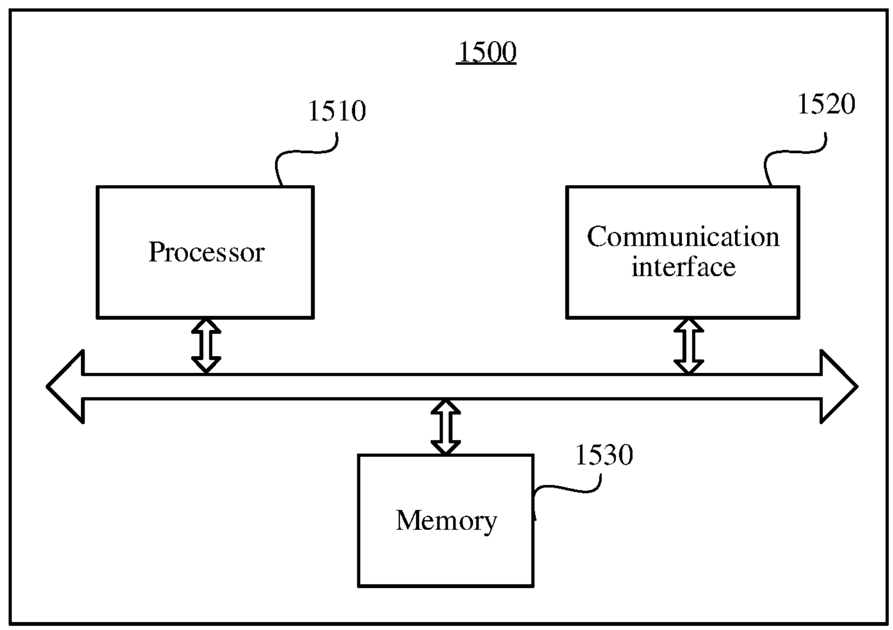
FIG. 15 is a schematic diagram of a structure of a communication apparatus according to an embodiment of this application.

The following describes, in detail with reference to FIG. 14 and FIG. 15, communication apparatuses provided in embodiments of this application. It should be understood that descriptions of apparatus embodiments correspond to the descriptions of the method embodiments. Therefore, for content that is not described in detail, refer to the foregoing method embodiments. For brevity, details are not described herein again.

The communication unit may also be referred to as a transceiver, a transceiver machine, a transceiver apparatus, or the like. The processing unit may also be referred to as a processor, a processing board, a processing module, a processing apparatus, or the like. Optionally, a component that is in the communication unit 1402 and that is configured to implement the receiving function may be considered as a receiving unit, and a component that is in the communication unit 1402 and that is configured to implement the sending function may be considered as a sending unit. That is, the communication unit 1402 includes the receiving unit and the sending unit. The communication unit sometimes may also be referred to as a transceiver machine, a transceiver, a transceiver circuit, or the like. The receiving unit sometimes may also be referred to as a receiver, a receiver machine, a receiver circuit, or the like. The sending unit sometimes may also be referred to as a transmitter, a transmitter machine, a transmitter circuit, or the like.

When the communication apparatus 1400 performs the function of the terminal device in the procedure shown in FIG. 2 in the foregoing embodiment, the processing unit is configured to generate M signals; and the communication unit is configured to send the M signals on M time-frequency resource elements, where the M signals are in a one-to-one correspondence with the M time-frequency resource elements, at least two of the M time-frequency resource elements partially overlap in frequency domain, any two of the M time-frequency resource elements do not overlap in time domain, and M is an integer greater than 1.

When the communication apparatus 1400 performs the function of the network device in the procedure shown in FIG. 2 in the foregoing embodiment, the processing unit is configured to determine M time-frequency resource elements; and the communication unit is configured to receive M signals on the M time-frequency resource elements, where the M signals are in a one-to-one correspondence with the M time-frequency resource elements, at least two of the M time-frequency resource elements partially overlap in frequency domain; any two of the M time-frequency resource elements do not overlap in time domain, and M is an integer greater than 1.

The foregoing descriptions are merely an example. The processing unit 1401 and the communication unit 1402 may further perform other functions. For more detailed descriptions, refer to related descriptions in the method embodiments shown in FIG. 2 to FIG. 13. Details are not described herein again.

FIG. 15 shows an apparatus 1500 according to an embodiment of this application. The apparatus shown in FIG. 15 may be an implementation of a hardware circuit of the apparatus shown in FIG. 14. The communication apparatus is applicable to the flowchart shown above, and performs functions of the terminal device or the network device in the foregoing method embodiments. For ease of description, FIG. 15 shows only main components of the communication apparatus.

As shown in FIG. 15, the communication apparatus 1500 includes a processor 1510 and a communication interface 1520. The processor 1510 and the communication interface 1520 are coupled to each other. It may be understood that the communication interface 1520 may be a transceiver or an input/output interface. Optionally, the communication apparatus 1500 may further include a memory 1530, configured to store instructions executed by the processor 1510, or input data required by the processor 1510 to run the instructions, or data generated after the processor 1510 runs the instructions.

When the communication apparatus 1500 is configured to implement the methods shown in FIG. 2 to FIG. 6, the processor 1510 is configured to implement a function of the processing unit 1401, and the communication interface 1520 is configured to implement a function of the communication unit 1402.

When the communication apparatus is a chip applied to a terminal device, the chip in the terminal device implements functions of the terminal device in the foregoing method embodiments. The chip in the terminal device receives information from another module (for example, a radio frequency module or an antenna) in the terminal device, where the information is sent by a network device to the terminal device. Alternatively, the chip in the terminal device sends information to another module (for example, a radio frequency module or an antenna) in the terminal device, where the information is sent by the terminal device to a network device.

When the communication apparatus is a chip applied to a network device, the chip in the network device implements functions of the network device in the foregoing method embodiments. The chip in the network device receives information from another module (for example, a radio frequency module or an antenna) in the network device, where the information is sent by a terminal device to the network device. Alternatively, the chip in the network device sends information to another module (for example, a radio frequency module or an antenna) in the network device, where the information is sent by the network device to a terminal device.

It may be understood that the processor in embodiments of this application may be a central processing unit (CPU), or may be another general-purpose processor, a digital signal processor (DSP), an application-specific integrated circuit (ASIC), a field programmable gate array (FPGA), another programmable logic device, a transistor logic device, a hardware component, or any combination thereof. The general-purpose processor may be a microprocessor, any conventional processor, or the like.

In embodiments of this application, the processor may be a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or a storage medium in any other form well-known in the art. For example, a storage medium is coupled to a processor, so that the processor can read information from the storage medium and write information into the storage medium. Certainly, the storage medium may be a component of the processor. The processor and the storage medium may be located in an ASIC. In addition, the ASIC may be located in a network device or a terminal device. Certainly, the processor and the storage medium may exist in the network device or the terminal device as discrete components.

A person skilled in the art should understand that embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specified function in one or more procedures in the flowcharts and/or in one or more blocks in the block diagrams.

The computer program instructions may alternatively be stored in a computer-readable memory that can guide a computer or another programmable data processing device to work in a specific manner, so that the instructions stored in the computer-readable memory generate an artifact that includes an instruction apparatus. The instruction apparatus implements a specified function in one or more procedures in the flowcharts and/or in one or more blocks in the block diagrams.

It is clear that, a person skilled in the art can make various modifications and variations to this application without departing from the scope of this application. In this way, this application is intended to cover these modifications and variations of this application provided that they fall within the scope of the claims of this application and their equivalent technologies.

What is claimed is:

1. A signal sending method, comprising:

generating M signals; and sending the M signals on M time-frequency resource elements, wherein the M signals are in a one-to-one correspondence with the M time-frequency resource elements, at least two of the M time-frequency resource elements overlap in a frequency domain, any two of the M time-frequency resource elements are free from overlapping in a time domain, the M signals are positioning sounding reference signals (SRSs), a bandwidth occupied by the M signals is greater than a maximum bandwidth supported by a REDCAP terminal device, and M is an integer greater than 1.

2. A signal receiving method, comprising:

determining M time-frequency resource elements; and receiving M signals on the M time-frequency resource elements, wherein the M signals are in a one-to-one correspondence with the M time-frequency resource elements, at least two of the M time-frequency resource elements overlap in a frequency domain, any two of the M time-frequency resource elements are free from overlapping in a time domain, the M signals are positioning sounding reference signals (SRSs), a bandwidth occupied by the M signals is greater than a maximum bandwidth supported by a REDCAP terminal device, and M is an integer greater than 1.

3. A communication apparatus, comprising:

one or more processors; and a non-transitory memory having instructions stored thereon that, when executed by the one or more processors, cause the communication apparatus to:

generate M signals; and send the M signals on M time-frequency resource elements, wherein the M signals are in a one-to-one correspondence with the M time-frequency resource elements, at least two of the M time-frequency resource elements overlap in a frequency domain, any two of the M time-frequency resource elements are free from overlapping in a time domain, the M signals are positioning sounding reference signals (SRSs), a bandwidth occupied by the M signals is greater than a maximum bandwidth supported by a REDCAP terminal device, and M is an integer greater than 1.

4. The communication apparatus according to claim 3, wherein signals that are a part of the M signals and correspond to an overlapping parts of the at least two of the M time-frequency resource elements in the frequency domain are used to combine the M signals.

5. The communication apparatus according to claim 3, wherein there is a time interval between any two of the M time-frequency resource elements that are adjacent in the time domain, and the time interval is a time required by a radio frequency transmission channel to perform radio frequency retuning.

6. The communication apparatus according to claim 3, wherein the at least two of the M time-frequency resource elements comprise a first time-frequency resource element and a second time-frequency resource element, wherein the first time-frequency resource element and the second time-frequency resource element are adjacent in the time domain, or the first time-frequency resource element and the second time-frequency resource element are free from being adjacent in the time domain.

7. The communication apparatus according to claim 3, wherein the at least two of the M time-frequency resource elements comprise a first time-frequency resource element and a second time-frequency resource element, the first time-frequency resource element corresponds to a first signal, and the second time-frequency resource element corresponds to a second signal, wherein a sending occasion corresponding to the first signal and a sending occasion corresponding to the second signal are consecutive sending occasions, or a sending occasion corresponding to the first signal and a sending occasion corresponding to the second signal are non-consecutive sending occasions.

8. A communication apparatus, comprising:

one or more processors; and a non-transitory memory having instructions stored thereon that, when executed by the one or more processors, cause the communication apparatus to:

determine M time-frequency resource elements; and receive M signals on the M time-frequency resource elements, wherein the M signals are in a one-to-one correspondence with the M time-frequency resource elements, at least two of the M time-frequency resource elements overlap in a frequency domain, any two of the M time-frequency resource elements are free from overlapping in a time domain, the M signals are positioning sounding reference signals (SRSs), a bandwidth occupied by the M signals is greater than a maximum bandwidth supported by a REDCAP terminal device, and M is an integer greater than 1.

9. The communication apparatus according to claim 8, wherein signals that are a part of the M signals and correspond to an overlapping parts of the at least two of the M time-frequency resource elements in the frequency domain are used to combine the M signals.

10. The communication apparatus according to claim 8, wherein there is a time interval between any two of the M time-frequency resource elements that are adjacent in the time domain, and the time interval is a time required by a radio frequency transmission channel to perform radio frequency retuning.

11. The communication apparatus according to claim 8, wherein the at least two of the M time-frequency resource elements comprise a first time-frequency resource element and a second time-frequency resource element, wherein the first time-frequency resource element and the second time-frequency resource element are adjacent in the time domain, or the first time-frequency resource element and the second time-frequency resource element are free from being adjacent in the time domain.

12. The communication apparatus according to claim 8, wherein the at least two of the M time-frequency resource elements comprise a first time-frequency resource element and a second time-frequency resource element, the first time-frequency resource element corresponds to a first signal, and the second time-frequency resource element corresponds to a second signal, wherein a sending occasion corresponding to the first signal and a sending occasion corresponding to the second signal are consecutive sending occasions, or a sending occasion corresponding to the first signal and a sending occasion corresponding to the second signal are non-consecutive sending occasions.

* * * * *